G. H. HALL.
ANIMAL CRATE.
APPLICATION FILED AUG. 10, 1918.
1,368,209.
Patented Feb. 8, 1921.
4 SHEETS—SHEET 1.
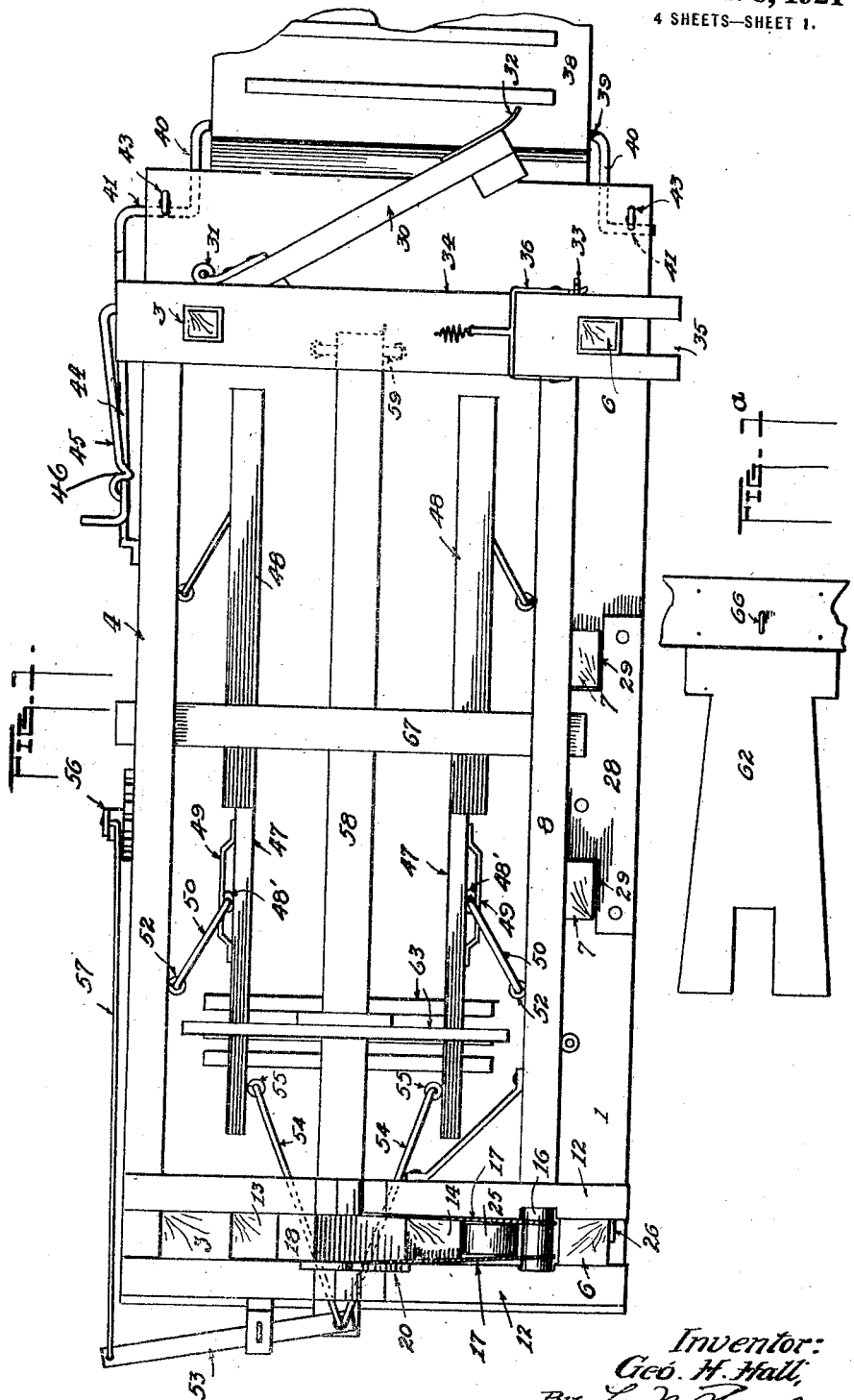
Inventor:
Geo. H. Hall,
By L. M. Thurlow
Atty.

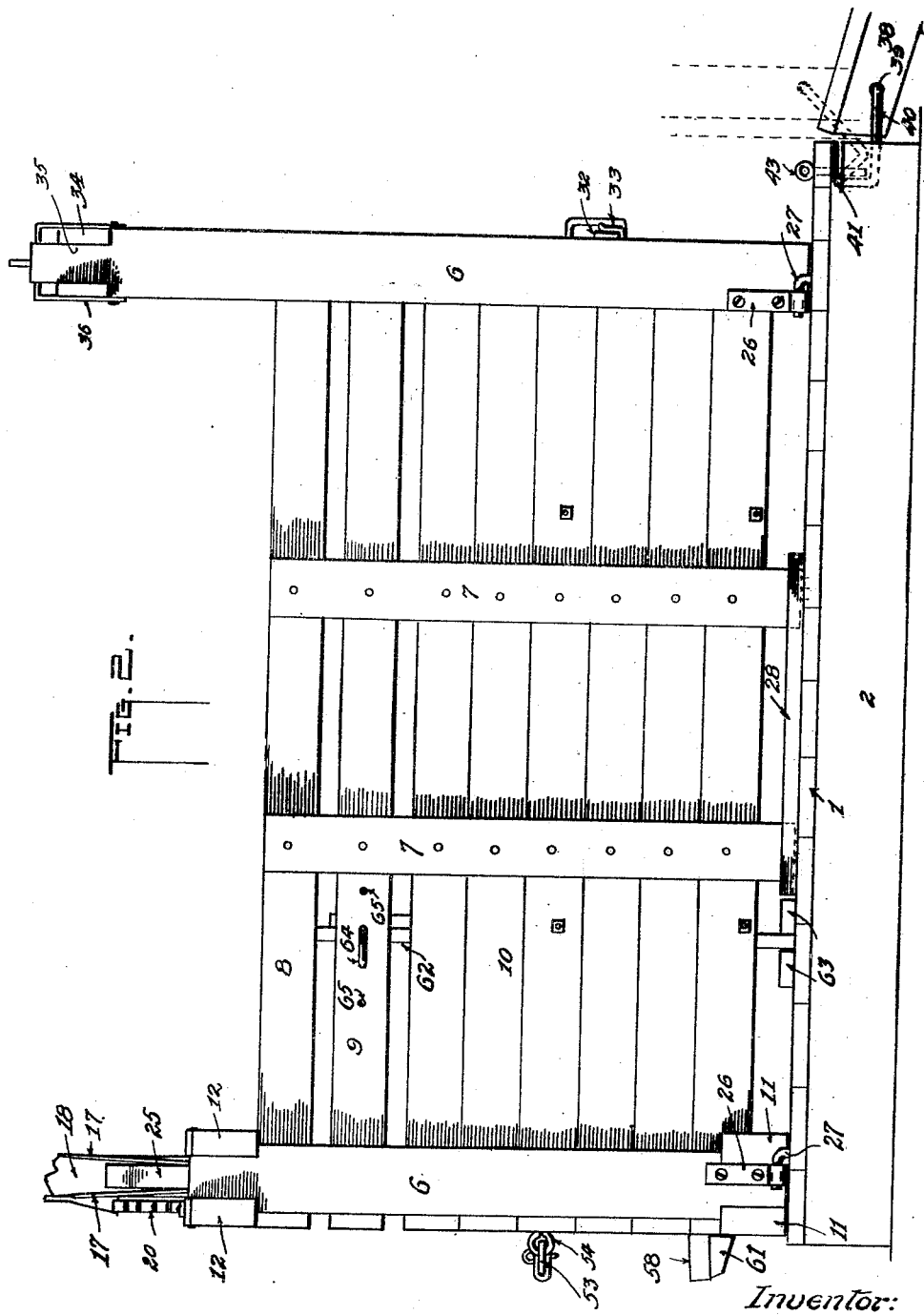

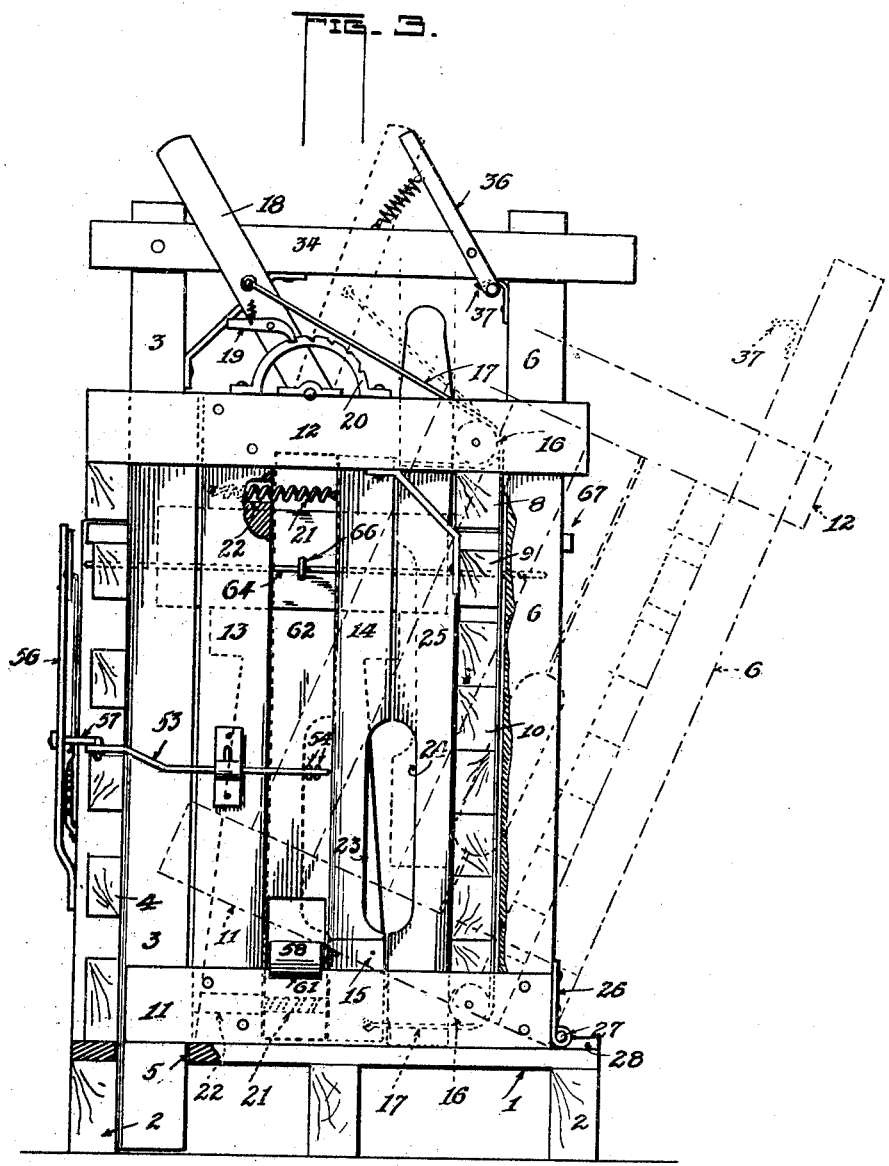

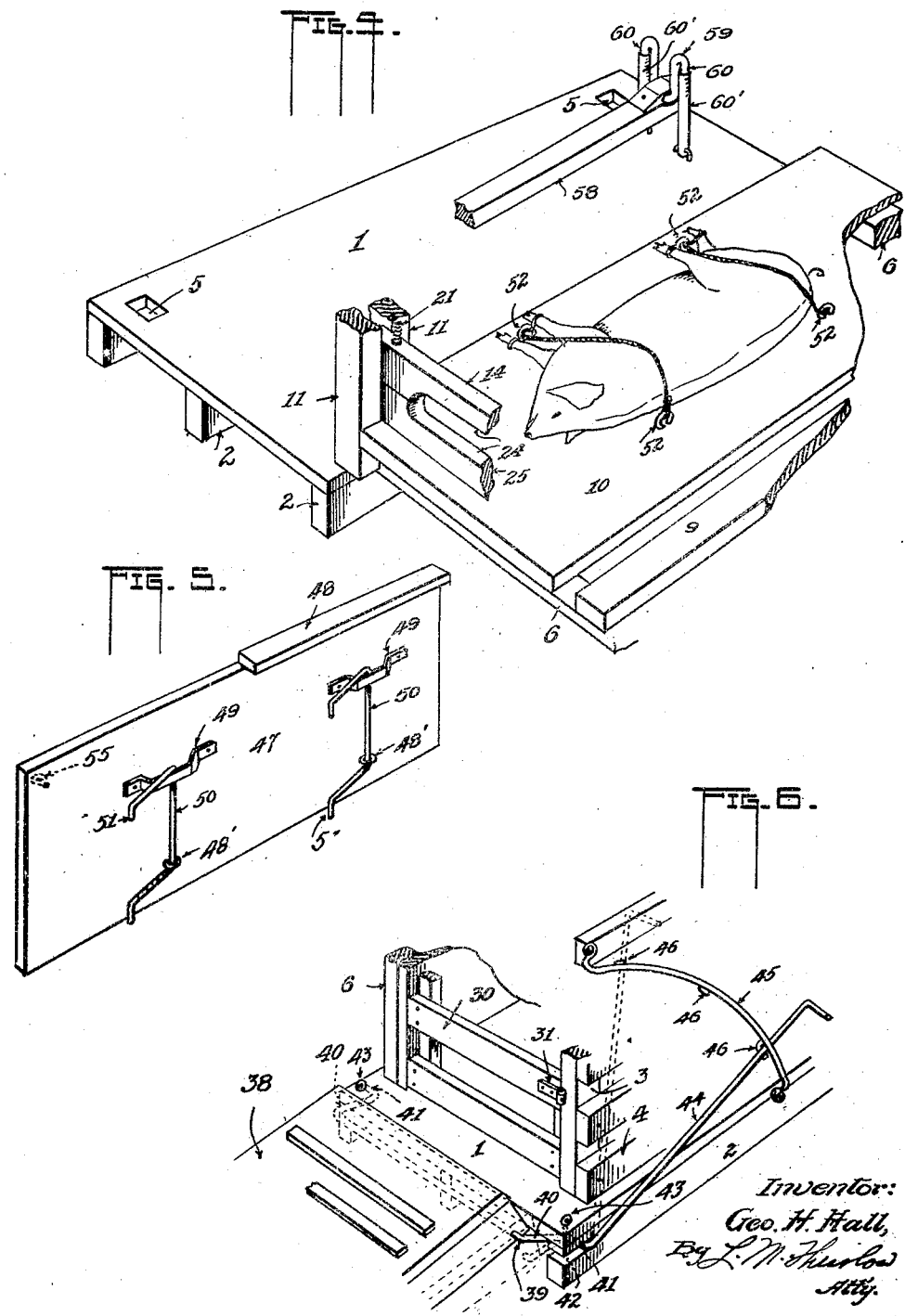

UNITED STATES PATENT OFFICE.

GEORGE H. HALL, OF HENRY, ILLINOIS.

ANIMAL-CRATE.

1,368,209. Specification of Letters Patent. Patented Feb. 8, 1921.

Application filed August 10, 1918. Serial No. 249,369.

*To all whom it may concern:*

Be it known that I, GEORGE H. HALL, citizen of the United States, residing at Henry, in the county of Marshall and State of Illinois, have invented certain new and useful Improvements in Animal-Crates; and I do hereby declare that the following is a full, clear, and exact description of the invention, which will enable others skilled in the art to which it appertains to make and use the same.

This invention relates to breeding and operating crates, and also to a crate for use in ringing hogs.

The invention has for one of its objects to furnish a crate for trapping hogs, that can be used for breeding purposes and for the purpose of operating upon the animals by providing a hinged side to which the animal may be strapped, and in which also the hog may be held by its head when placing a ring through its snout.

Another object is to construct a crate of this class that is wholly collapsible in order that it may be placed in "knock-down" form for storage and shipment.

Another object is to provide for holding the hog by its head by a unique operating means, all of which will appear in the following specification, aided by the accompanying drawing, wherein, Figure 1 is a plan of my improved crate;

Fig. 1ª shows a board used within the crate;

Fig. 2 is an elevation of one side of the crate;

Fig. 3 is an elevation of the front side of the same;

Fig. 4 shows, in perspective, a part of the crate, one of whose sides is lowered from its normal position;

Fig. 5 shows, in perspective, a side-board; and,

Fig. 6 shows, in perspective, an approach or runway and means for adjusting it vertically or with respect to the floor level of the crate.

1 indicates a platform supported upon suitable longitudinal sills 2. One of the sides of the crate includes a pair of uprights 3, one at the front and one at the rear of the platform connected by spaced members 4. These upright members extend preferably through openings 5 in the platform, the lower of the members 4 resting upon the platform for supporting the side, the openings 5 being clearly shown in Figs. 3 and 4. This construction makes said side removable for knock-down purposes, being held rigidly in position by the other inclosing portions to be described.

The opposite side of the crate is illustrated in Figs. 2 and 4. It consists of the several uprights 6, 6—7, 7, the first two forming the corner supports at the ends of the platform, the uprights 7, 7, being near the middle of the latter. All of the uprights are connected by spaced members 8 and 9, and the planking represented at 10 which is preferably in the closed form to constitute, when let down as in Fig. 4, an operating table for the animal, the use of which table will be described later herein.

Connected with the front upright member 6 as shown in Figs. 3 and 4 is a pair of lower horizontal members 11 and a pair of upper horizontal members 12. These are spaced from one another and lie at each side of the members 6. At their free ends they engage opposite sides of the adjacent upright member 3. Spaced from the immediate free end of said members and held between them is an upright 13 constituting with the parts described a rigid frame forming part of the front end of the crate.

14 is an upright bar slidable between the pairs of members 11 and 12 described, there being a guide-block 15 secured to said upright 14 to rest upon and slidably engage one of the said lower members 11.

16, 16 indicate two rollers, one between the lower members 11 and one between the upper members 12. 17, 17 indicate a pair of flexible members such as cables or chains both secured at one of their ends to a lever 18 pivoted between the members 12, and provided with a spring latch 19 to engage in the notches of a quadrant 20. The other ends of the cables are separately attached to the upper and lower ends of the said bar 14.

21, 21 are springs attached at one of their ends to the members 14 at the upper and lower end, their other ends being attached in suitable manner to the upright 13, and are preferably let into recesses 22 in the member 13 so that they can be given considerable length and have sufficient power to draw the member 14 against said member 13 or to the position shown in dotted lines in Fig. 3.

It will be observed that by disengaging the latch 19 and letting the lever 18 move to the right as viewed in the figure last referred to, the springs will draw the bar 14 to the dotted line position mentioned. Said member 14 is provided with a recess 23 which, together with a recess 24 in a member 25 corresponding to 14, creates an opening through which the animal's head is placed when desired to hold it for "ringing" purposes. The member 25 is removable by drawing it upward from between the members 11 and 12 as indicated in dotted lines so that after the member 14 has been moved to its described dotted line position a free passage-way is created for the escape of the animal. The side made up of the uprights 6, 7 and the members 8, 9, and 10 is hingedly mounted on the platform.

26 indicates a pair of hinge members secured to the members 6, for example, and 27 are hinge-pins secured in the platform in any suitable manner for receiving the eyes of the said hinge members.

This structure permits the side having said hinge members to be dropped down and also to be disengaged entirely, if desired, for crating purposes.

Preferably there is secured on the platform a member 28 recessed at two places 29 to receive the lower extended ends of the described members 7, 7. When the side is in its vertical position this member 28 prevents longitudinal movement of the side. When let down to the position shown in Fig. 4 where the members 7, 7 will have become disengaged from the member 28 it is evident that the said side when shifted from off the hinge-pins 27 can be entirely removed from the platform.

The rear end of the crate is closed by a suitable gate 30 which may be hinged to the rear upright member 3, one of the hinges being illustrated at 31 in Fig. 6, there being a latch 32 of any suitable form to engage a keeper 33 on the rear upright 6.

The rear member 3 to which the gate is hinged carries a cross-member 34, Figs. 1 and 3, suitably braced with respect thereto. As shown in Fig. 1, this member 34 is bifurcated at 35 to receive the rear member 6 of the hinged side. A suitable spring latch 36 is pivoted to the member 34 and receives a hook 37 on said member 6. That is to say, when the hinged side is in its raised or normal position, the hook has engagement with the latch and sustains said side in position.

38 is a runway or approach mounted so as to be adjusted vertically with respect to the platform 1, for accommodating large or small animals. In order to provide for change in this position there is provided a bail 39 supporting said platform bent at each side of the platform into arms 40 which arms are bent parallel to the bail 39 forming other arms 41 and engage in slots 42 in one of the supporting sills 2, 43 indicating retaining pins to hold the arms in place.

One of the latter arms is extended into a lever 44 to engage behind a quadrant 45 secured on one side of the crate, there being at one or more points extensions 46 to receive said lever for supporting the platform 38 at various elevations.

In Fig. 2 the platform 38 is indicated in a raised or vertical position in which position it will be retained upon moving the lever 44 to the position shown in dotted lines in Fig. 6, since it is clamped against the end of the platform 1. This is merely a disposal of said platform 38 when raising it out of the way when the crate is not in use. However, it may be entirely removed as may be understood by withdrawing the retaining pins 43.

47, 47 indicate the usual side-boards used in devices of this character disposed in a vertical position and are provided with foot boards 48, most clearly shown in Fig. 5.

On their outer sides each is provided with an eye 48' near each end and 49 is a bail above each of said eyes. 50 is a bail extending through each eye and its companion bail and having down-turned extremities 51. These engage in eyes 52 secured in the sides of the crate, pairs of these being shown in Fig. 4 on the table 10.

53 is a lever pivoted on the front of the crate in any suitable manner, there being links 54 connecting one end thereof with each of the side-boards by means of eyes 55 on the latter from which the said links are readily removable.

56 is a lever pivoted on the crate at any desired place, preferably the side made up of the parts 3 and 4.

57 is a rod connecting the two levers as shown whereby the adjustment of the lever 56 will move the side board toward one another for a purpose well known. 58 is a bar also common to breeding crates having a pivotally mounted portion 59 at one end provided with parallel extensions 60 which enter sockets permanently mounted on and pivoted to the platform 1. By this structure the bar may be readily attached and detached. The other end of the bar is hooked as at 61 to engage over one of the lower members 11 which holds said bar in its raised position.

After the animal has been driven into the crate it is held by latching the rear gate 30 to the side board as adjusted; after which a front board 62, shown clearly in Fig. 1ª, is set in between the sides of the crate between any two of a series of cleats 63 on the platform 1, the board 62 being bifurcated to permit it to stand astride the bar 58 without interfering with that member. The upper end of the board is held in position by means of a rod 64 which may be passed through any one of a series of holes 65 in opposite upper members 4 and 9 and through an eye 66 carried by said board 62. This board locates the animal and holds it from moving forward. To prevent the animal from jumping from the crate a board 67 is inserted between the horizontal members of the sides.

When desired to "ring" a hog it is driven up to the front of the crate with its head extended beyond the members 14 and 25 whereupon the lever 18 is moved in the direction of the position shown in full lines in Fig. 3 which effectively prevents its escape.

The board 25 can be removed after the ringing operation and the member 14 permitted to move under the pull of the springs 21, thus providing an exit for the animal. However, the links 54 are first disconnected from the eyes 55 so as to be drawn out of the way of the animal and from between the described members and to permit said member 14 free movement.

When it is desired to operate on an animal, the side board 47 suspended from the side of the crate creating the table 10 is removed whereupon the animal can be tied or strapped to the eyes 55 of said side and that side can then be let down as shown in Fig. 4, the hog being carried to a reclining position.

The rear gate 30 is removable, the side made up of the parts 3 and 4 is removable, as also the platform or approach 38, in addition to the fact that the hinged side can be detached by moving it longitudinally to release it from the hinge-pins 27 makes the device completely collapsible.

The crate has all of the advantages necessary in the care of animals and while I have shown preferred manners of constructing and installing the parts, I may make slight changes therein as may suggest themselves without departing from the spirit and intent of the invention.

Having thus described my invention, I claim:—

1. A crate of the class described, including in its construction, a platform, a side portion hingedly mounted thereon in a quick detachable manner being detachable by a longitudinal movement of the same when in a reclining position, means on the platform to prevent such removal when the said side is in its upright position, and an end portion rigidly attached to and carried by said side portion, an associated side portion detachably mounted upon the platform, and a gate at one end hingedly attached to one of the described side portions.

2. A crate for the uses described, including in combination, a platform, side portions detachably mounted on the same, hinge members secured to one of them, a hinge pin secured in the platform at each said hinge lying parallel to the said side and having a free end adapted to receive said hinge members whereby the side may be attached or detached by a movement thereof in a longitudinal direction when in one of its positions, and means to prevent the detachment of said side when in another of its positions.

3. A crate for the uses described, including in combination, a platform, side portions detachably mounted on the same, hinge members secured to one of them, a hinge pin secured in the platform at each said hinge lying parallel to the said side and having a free end adapted to receive said hinge members whereby the side may be attached and detached by a movement thereof in a longitudinal direction when in one of its positions, means to prevent the detachment of said side when in another of its positions, and interlocking devices on the two sides adapted to automatically engage for holding the hinged side in an upright position.

4. A crate for the uses described including a platform, sides and ends forming an inclosure, one of said ends including spaced portions at top and bottom, a pair of members lying between said spaced portions, one of them being movable in a lateral direction, a lever, a pair of flexible members connected at one of their ends to said lever and at their opposite ends to opposite ends of the movable member, a portion over which each flexible member is trained, and springs attached to the movable member, the other member of the said pair of members being removable in a longitudinal direction from said end.

5. A crate for the uses described including in its construction a platform, a runway, a lever pivoted on the platform including a lever-arm carrying said runway at its free end adapted to adjust the height of the latter and adapted in one of its positions in conjunction with the platform to maintain said runway in a vertical position.

6. A crate for the uses described including in its construction a platform, a runway adapted when raised to a vertical position to rest against the end of the platform, and a lever pivoted on the platform including a lever-arm carrying the runway adapted when the latter is raised to said vertical position to clamp it against said platform.

7. A crate for the uses described, a platform, side and end portions forming an inclosure, one of the sides being hingedly related to said platform and adapted to be dropped to a reclining position, side boards mounted upon said side portions, one of the side boards including supporting bails, and devices secured to the described hinged side portion on which the bails are hung, and from which they are removable in a quick detachable manner.

In testimony whereof I affix my signature, in presence of two witnesses.

GEORGE H. HALL.

Witnesses:
GLENN E. SEEDS,
L. O. EAGLETON.